US010033477B2

(12) United States Patent
Bratkovski et al.

(10) Patent No.: US 10,033,477 B2
(45) Date of Patent: Jul. 24, 2018

(54) SPATIAL MULTIPLEXING FOR OPTICAL TRANSMISSION

(75) Inventors: Alexandre M Bratkovski, Mountain View, CA (US); Jacob Khurgin, Pikesville, MD (US); Wayne Victor Sorin, Mountain View, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1047 days.

(21) Appl. No.: 13/560,450

(22) Filed: Jul. 27, 2012

(65) Prior Publication Data
US 2014/0029941 A1 Jan. 30, 2014

(51) Int. Cl.
*H04J 14/04* (2006.01)
(52) U.S. Cl.
CPC .................................. *H04J 14/04* (2013.01)
(58) Field of Classification Search
CPC . H04J 14/02; G02B 6/12007; G02B 6/29343; G02B 2006/12107; G02B 2006/12142; H04B 10/2581; H04B 10/548; H04B 10/524
See application file for complete search history.

(56) References Cited

U.S. PATENT DOCUMENTS

| 4,669,814 A | * | 6/1987 | Dyott .............................. 385/42 |
| 4,741,586 A | * | 5/1988 | Kim et al. ...................... 385/28 |
| 5,343,542 A | * | 8/1994 | Kash ................... G02B 6/12007 372/45.01 |
| 5,917,974 A | * | 6/1999 | Tavlykaev et al. .............. 385/50 |
| 6,525,853 B1 | * | 2/2003 | Stuart ............................ 398/115 |
| 2004/0018017 A1 | * | 1/2004 | Hatayama ........................ 398/43 |
| 2009/0067843 A1 | * | 3/2009 | Way et al. ........................ 398/79 |

* cited by examiner

*Primary Examiner* — Ken N Vanderpuye
*Assistant Examiner* — David Lambert
(74) *Attorney, Agent, or Firm* — Tarolli, Sundheim, Covell & Tummino L.L.P.

(57) ABSTRACT

A system includes an optical Y-junction coupler to receive a first modulated optical signal on a wide input path of the optical Y-junction coupler and to receive a second modulated optical signal on a narrow input path of the optical Y-junction coupler, wherein the optical Y-junction coupler generates a combined optical signal from signals received on the wide input path and the narrow input path. A multimode waveguide receives the combined optical signal from the optical Y-junction coupler and propagates a spatially multiplexed optical output signal along a transmission path.

13 Claims, 8 Drawing Sheets

US 10,033,477 B2

SPATIAL MULTIPLEXING FOR OPTICAL TRANSMISSION

BACKGROUND

Transmitting information via an optical domain has become the mainstay of today's data communications primarily due to a potentially large bandwidth extending over a few TeraHz. Accessing this wide bandwidth places demands on the devices and components used in such communications. Some optical communications schemes can require sophisticated optical components such as gratings, filters, and lasers applied over a number of individual channels which can increase the cost of the systems. Another scheme relies on advanced modulation formats yet such techniques can place even more design constraints at the receiving end of the respective channels which can further add cost to the system.

DETAILED DESCRIPTION

A spatially multiplexed optical transmission system and method is provided where modulated optical signals are combined and launched along a data transmissions path to increase information bandwidth while mitigating system costs. Information bandwidth can be increased since parallel optical input signals can be combined and transmitted in such a manner as to mitigate interference between the signals yet enable transmission of the signals along a reduced subset of signal paths. In one example, YY-junction optical couplers can be employed to combine multiple modulated optical input signals. Narrow and wide input paths to the YY-junction couplers can be utilized to enable different modes of propagation for the modulated signals. Combined output from the Y-junctionY-junction coupler (or couplers) can be applied to a multimode waveguide which in turn launches multiple propagating transmission signals that are orthogonal to each other and thus can travel along a shared transmission path while not causing interference between the signals. Such orthogonal propagation provides spatial multiplexing for different communications signals along the transmission path. By spatially multiplexing optical signals on to a shared transmissions path, receiving components for the multiplexed optical signals can be simplified and thereby reduce system costs.

Figure 1:
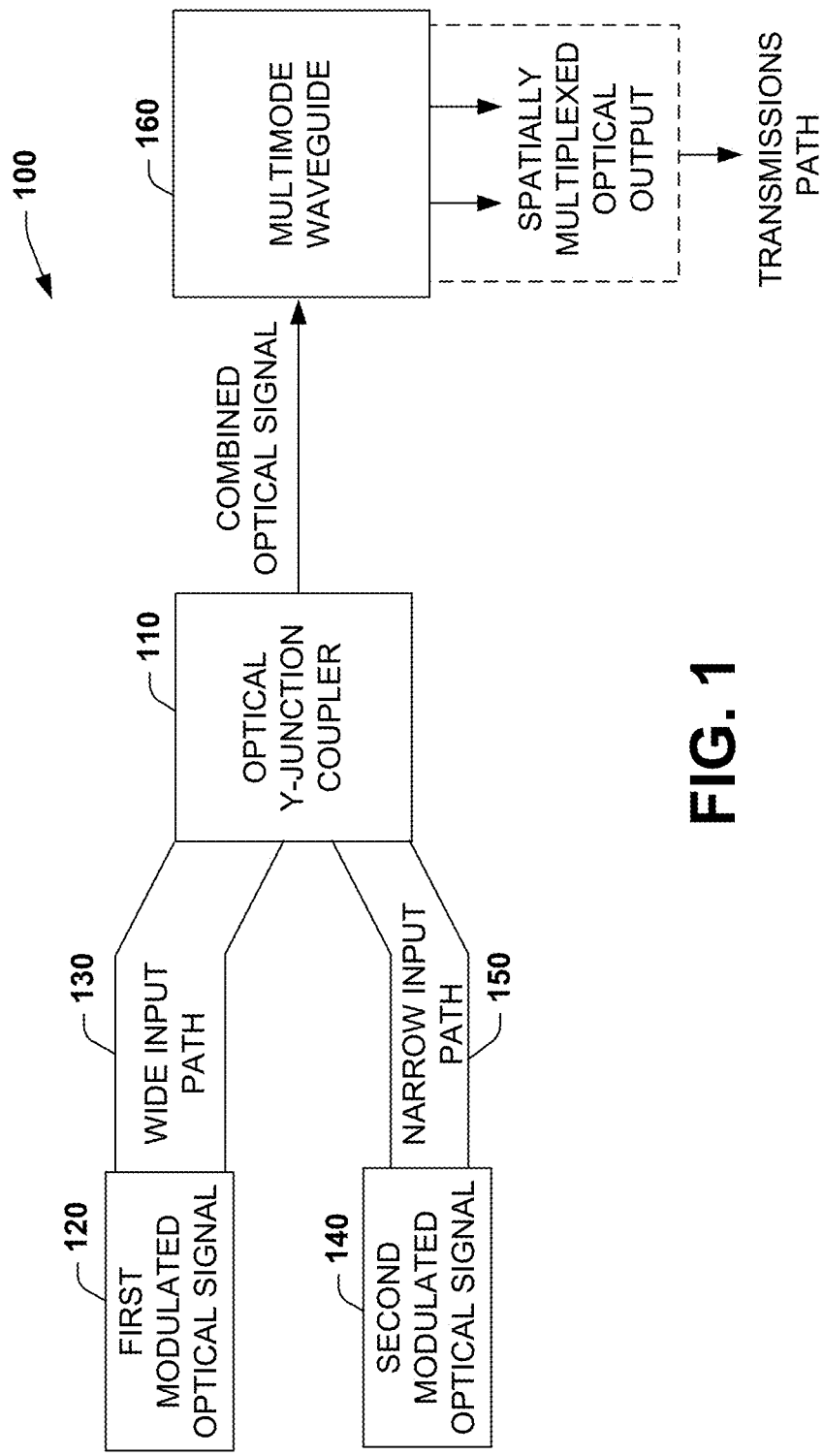
FIG. 1 illustrates an example of a system that facilitates optical data transmission via spatial multiplexing of combined optical signals.

FIG. 1 illustrates an example of a system 100 that facilitates optical data transmission via spatial multiplexing of combined optical signals. The system 100 includes an optical Y-junction coupler 110 to receive a first modulated optical signal 120 on a wide input path 130 of the optical Y-junction coupler and to receive a second modulated optical signal 140 on a narrow input path 150 of the optical Y-junction coupler. As used herein, narrow and wide refer to differing waveguide dimensions of the Y-junction coupler 110, wherein narrow input path 150 refers to a smaller waveguide width dimension than the wide input path 130. The optical Y-junction coupler 110 generates a combined optical signal from modulated signals received on the wide input path 130 and the narrow input path 150 which can include modulated data (e.g., encoded, encrypted, compressed, or otherwise). A multimode waveguide 160 receives the combined optical signal from the optical Y-junction coupler 110 and propagates a spatially multiplexed optical output signal along a transmission path. The spatially multiplexed optical output generated on the transmissions path can be applied to various applications such as utilizing the transmissions path in an optical communications bus, in an optical backplane, or as a signal path within a light processor, for example, that employs optical signals for data processing, communications, or instruction execution. In one example, the optical backplane can include a planar waveguide or an optical fiber. The planar waveguide can be constructed using various materials such as glass or polymer.

In general, the Y-junction optical coupler 110 can be employed to combine multiple modulated optical input signals received from the wide input path 130 and the narrow input path 150. In another example, multiple Y-junction couplers can be cascaded and multiplexed to increase system data throughput as will be illustrated and described below. The narrow input path 150 and wide input path 130 to the Y-junction coupler 110 can be utilized to enable different modes of propagation for the modulated signals 120 and 140. Combined output from the Y-junction coupler 110 (or couplers) can be applied to the multimode waveguide 160 which in turn launches multiple propagating transmission signals that are orthogonal to each other and thus can travel along the transmission path while not causing interference between the signals. Such orthogonal propagation provides spatial multiplexing for different communications signals along the transmission path. By spatially multiplexing optical signals on to the transmissions path, receiving components for the multiplexed optical signals can be simplified and thereby reduce system costs as noted previously.

Various modulation techniques can be employed to generate the first modulated signal 120 and the second modulated signal 140. Thus, space division-multiplexing (SDM) described herein provides another dimension to optical multiplexing and can be combined with other multiplexing methods in order to increase the effective bit rate along the transmissions path. In one example, a straight-forward on-off keying (OOK) modulation can be utilized for the multimode multiplexed channels generated at the output of the multimode waveguide 160. If higher bandwidth is desired, one or more of the input channels can be modulated using different formats—for example frequency-keyed shifting (FSK), or one of the coherent formats, such as quadrature phase shift keying (QPSK), for example. In another example, a pulse amplitude modulation (PAM) method can be employed for the modulation techniques. One aspect of the system 100 is the ability to utilize different multimode-multiplexed (MM) channels that can also use different modulation formats within the same (or similar) frequency band. Furthermore, one or more of the MM channels can also be coarse wavelength multiplexed, for example.

As long as the wavelengths are not substantially too close to each other (e.g., one 1300 nm and the other is 1350 nm) coarse wavelength division multiplexing (CWDM) signals can follow the same path and end up in the same output of the receiver (See FIG. 2 below with receiver at other end of transmissions path) where they can be subsequently de-multiplexed using a coarse filter. This implies that capacity of the transmissions path can be increased by implementing additional multiplexing in each MM channel without changing the core of the system 100. The modulation methods described herein and applied to the wide input path 130 and the narrow input path 150 can include electrically modulated vertical cavity surface emitting lasers (VCSEL's) with OOK or Frequency Division Multiplexing (FDM), for example. Other style lasers that can be coupled to the respective inputs of the Y-junction coupler 110 can include a Fabry-Perot laser or a distributed feedback laser, for example. An external Mach-Zehnder interferometer (MZI) modulator could also be employed for generating the modulated optical inputs.

For purposes of simplification of explanation, in the example of FIG. 1, different components of the system 100 are illustrated and described as performing different functions. However, one of ordinary skill in the art will understand and appreciate that the functions of the described components can be performed by different components, and the functionality of several components can be combined and executed on a single component.

Figure 2:
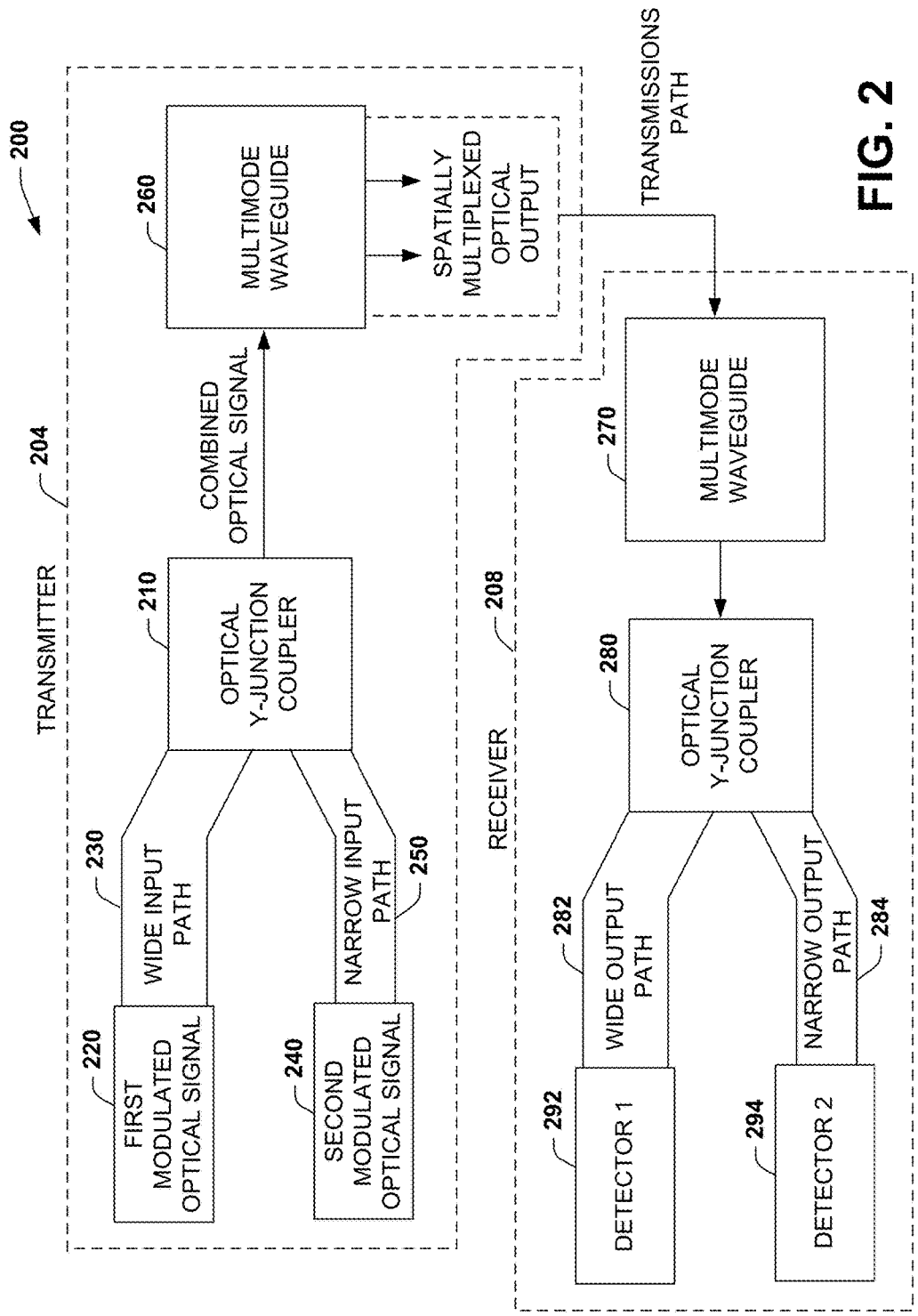
FIG. 2 illustrates an example of a transceiver system that facilitates optical data transmission and reception via spatial multiplexing of combined optical signals.

FIG. 2 illustrates an example of a transceiver system 200 that facilitates optical data transmission and reception via spatial multiplexing of combined optical signals. As shown, the system 200 can include a transmitter 204 (similar to FIG. 1 above) that generates a spatially multiplexed optical output that is received by a receiver 208. The transmitter 204 includes an optical Y-junction coupler 210 to receive a first modulated optical signal 220 on a wide input path 230 of the optical Y-junction coupler and to receive a second modulated optical signal 240 on a narrow input path 250 of the optical Y-junction coupler. The optical Y-junction coupler 210 generates a combined optical signal from modulated signals received on the wide input path 230 and the narrow input path 250 which can include modulated data (e.g., encoded, encrypted, compressed, or otherwise). A multi-mode waveguide 260 receives the combined optical signal from the optical Y-junction coupler 210 and propagates a spatially multiplexed optical output signal along a transmission path that is operatively coupled to the receiver 208 (e.g., coupled via optical fiber).

The receiver 208 utilizes similar optical principals as the transmitter 204 to process the spatially multiplexed optical output. As shown, a multimode waveguide 270 receives the spatially multiplexed optical output from the transmitter 204 and provides a combined optical waveform to the input of a Y-junction coupler 280 which is operated in the reverse of the Y-junction coupler 210 of the transmitter 204. Output of the Y-junction coupler 280 is supplied to a wide output path 282 and a narrow output path 284 of the Y-junction coupler which de-multiplexes the combined optical output from the transmitter 204. A first detector 292 can be employed to detect modulated data received from the wide output path 282 and a second detector 294 can be employed to detect modulated data received from the narrow output path 284. As will be illustrated and described below, both the transmitter 204 and the receiver 208 can utilize cascaded Y-junction couplers to increase the amount of data that is spatially multiplexed along the transmissions path.

Figure 3:
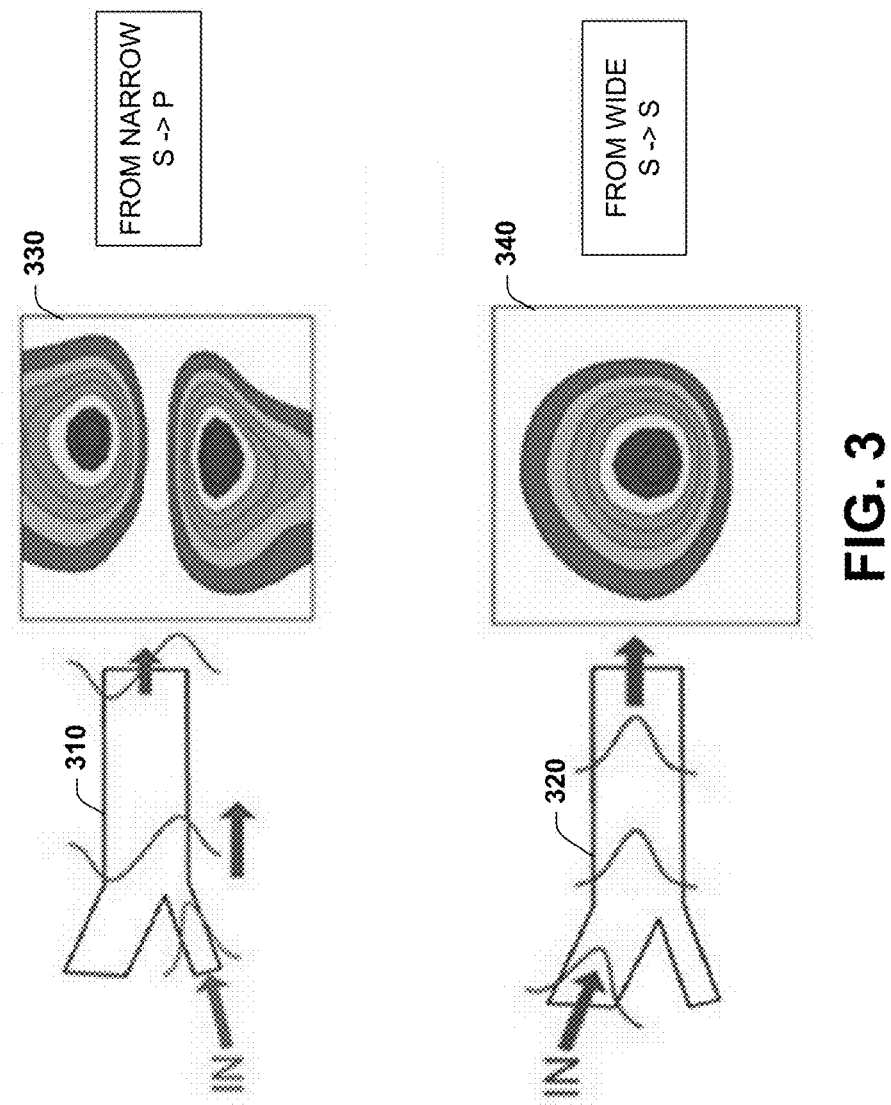
FIG. 3 illustrates an example of Y-junction couplers that launch different propagation modes for optical signals.

FIG. 3 illustrates an example of Y-junction couplers 310 and 320 that launch different propagation modes for optical signals. An adiabatic mode transformation is provided by the Y-junction couplers that are sometimes used in add-drop filters, for example. For instance, a nodeless main mode can be launched (referred to as an s-wave by analogy with quantum mechanics) incoming towards the Y-junction from a narrow waveguide, and can be transformed into a mode with one node having two-lobes (p-wave) as shown at 330. As used herein, an s-wave refers to a spherically symmetric wave (one concentric lobe) whereas a p-wave refers to a spherically asymmetric wave (two lobes). Similarly, an s-wave incoming from the wide branch at 320 remains a nodeless s-wave as shown at 340.

By cascading Y-junctions as will be illustrated and described below, four s-modes can be launched. From the Y-junctions, two of those modes can be transformed into orthogonal horizontally oriented p-modes, while retaining the other two s modes. Further, one of the respective p-modes can be transferred into a d-wave mode with four nodal lines while one of the s-waves can be converted into vertically oriented p-mode. Thus, four orthogonal modes can be launched (e.g., s, p-horizontal, p-vertical, d) propagating independently in a single waveguide. As will be illustrated and described below, four waveguides on a horizontal plane can be employed, wherein output from each waveguide can be combined into two Y-junctions, Y1 and Y2, and then the roots of the Y-junctions can be combined into one multi-mode waveguide. In one example, rectangular waveguides can be employed, wherein the polarization can be preserved, but with the possibility of mixing of px- and py-modes in curved waveguides. To avoid complication, one can use a diversity scheme to read the average signal from px and py modes respectively, or drop one of the respective p-channels altogether, for example. Various configurations for waveguides, Y-junction couplers, optical transmitters, optical receivers, and modulation schemes are illustrated and described below with respect to FIGS. 4-7.

Figure 4:
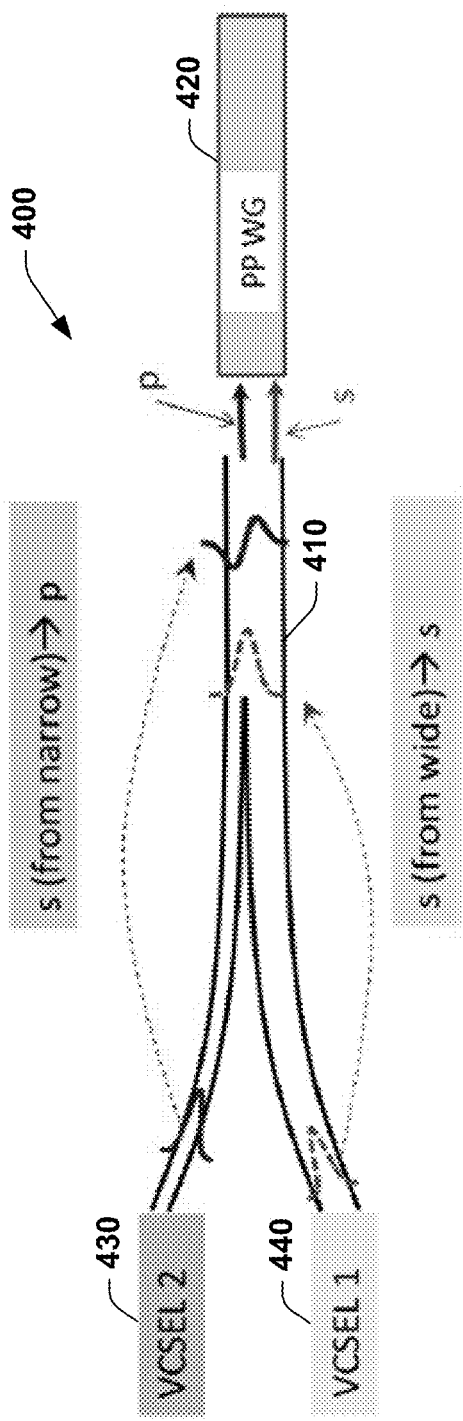
FIG. 4 illustrates an example optical transmitter system utilizing a Y-junction coupler to launch different propagation modes into a multimode waveguide.

FIG. 4 illustrates an example optical transmitter system 400 utilizing a Y-junction coupler 410 to launch different propagation modes into a multimode waveguide 420. As shown, vertical cavity surface emitting lasers (VCSEL's) 430 and 440 can be employed to drive narrow and wide waveguide inputs to the Y-junction coupler 410, wherein propagation modes p and s generated from the respective inputs are supplied to the multimode waveguide 420. As shown, the Y-junction coupler 410 provides mode conversion of s→s and s→p in the Y-junction. The s-wave launched in the narrow branch, propagates as p-wave with one node into the wider branch. Launching can be performed by two modulated VCSELs 430 and 440, and then the combined signal may be directed into the multimode waveguide 420 (e.g., polarization preserving waveguide (PP WG)).

Figure 5:
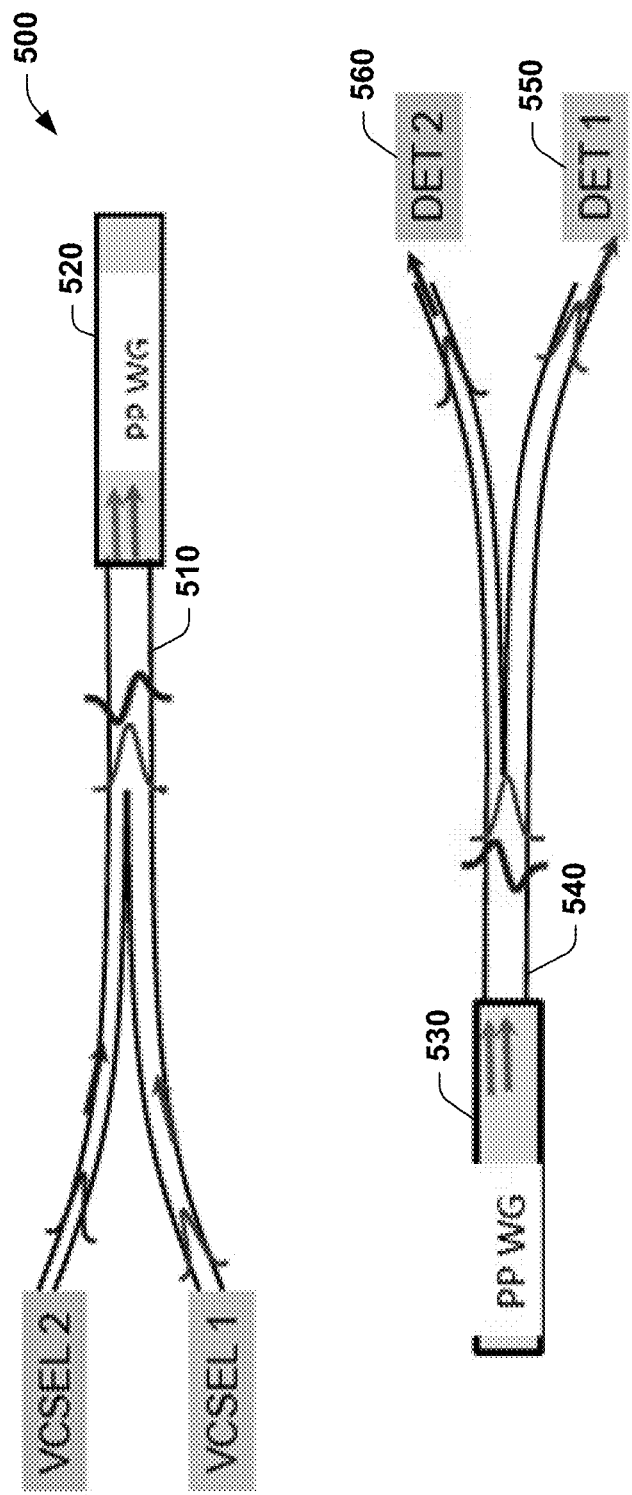
FIG. 5 illustrates an example optical transmitter and receiver system utilizing a Y-junction coupler to launch different propagation modes into a multimode waveguide for spatially multiplexed transmission and a multimode waveguide and Y-junction coupler for reception of multiplexed optical signals.
Figure 7:
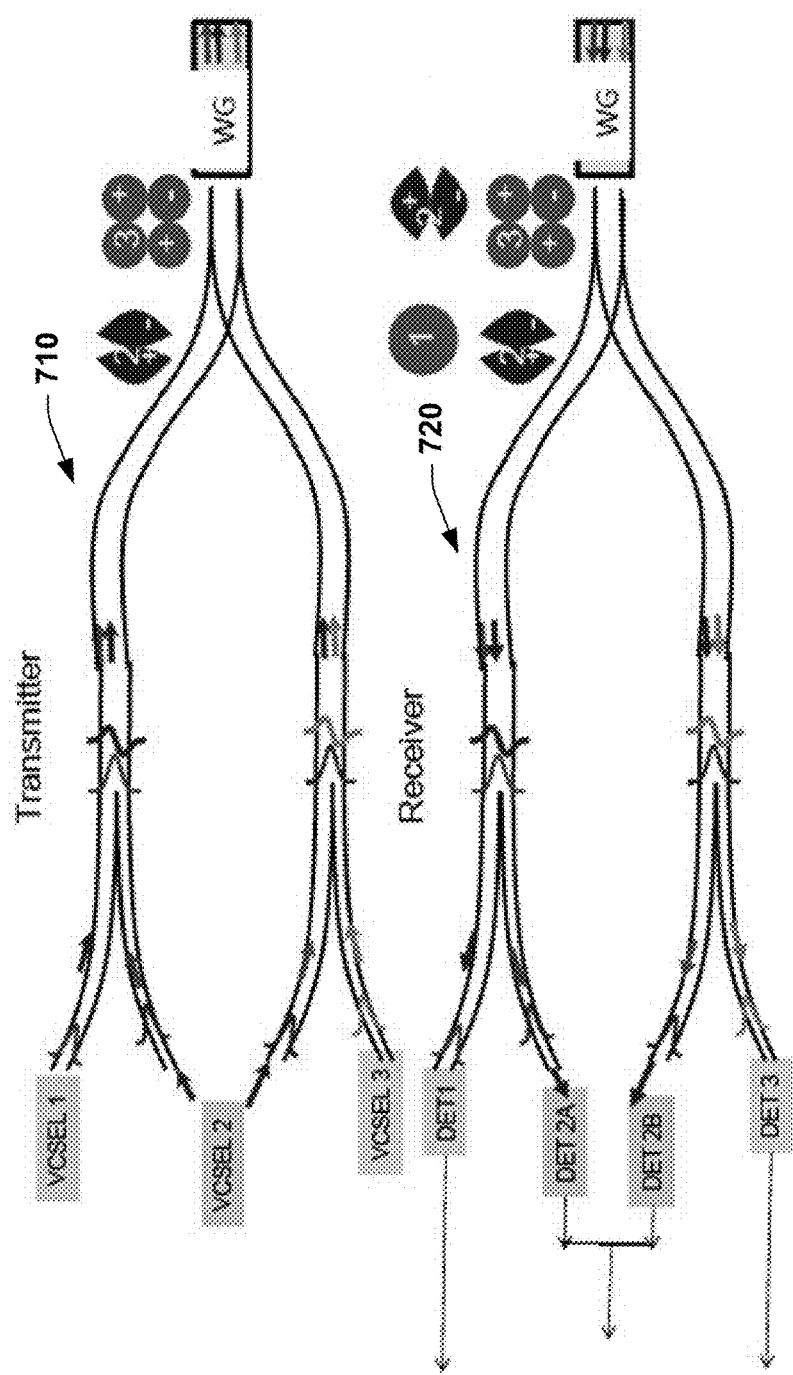
FIG. 7 illustrates an alternative configuration for a cascaded set of Y-junction couplers for generating and receiving spatially multiplexed optical signals.

FIG. 5 illustrates an example optical transmitter and receiver system 500 utilizing a Y-junction coupler 510 to launch different propagation modes into a multimode waveguide 520 for spatially multiplexed transmission and a multimode waveguide 530 and Y-junction coupler 540 for reception of multiplexed optical signals. In one example, a set of adiabatic mode-converting couplers (AMCC) 510 and 540 can be employed to multiplex and de-multiplex the modes in the waveguides 520 and 530, respectively. In this example, two symmetric modes can be launched into waveguide 540 that excite different symmetry modes in the waveguide (even, odd) and then splitting out into two detectors 550 and 560 as original even modes. The first waveguide node from Y-junction 510 is wider than the second waveguide node, and, as a result its mode can be coupled into the symmetric mode of the two-mode waveguide while the mode of the second waveguide can be coupled into the anti-symmetric mode of the two-mode waveguide. The de-multiplexing provided by the Y-junction and associated wide/narrow nodes can operate in a similar manner. One issue however can be that the second mode in the waveguide may rotate and thus alternative configurations can be provided such as depicted in FIG. 7.

Figure 6:
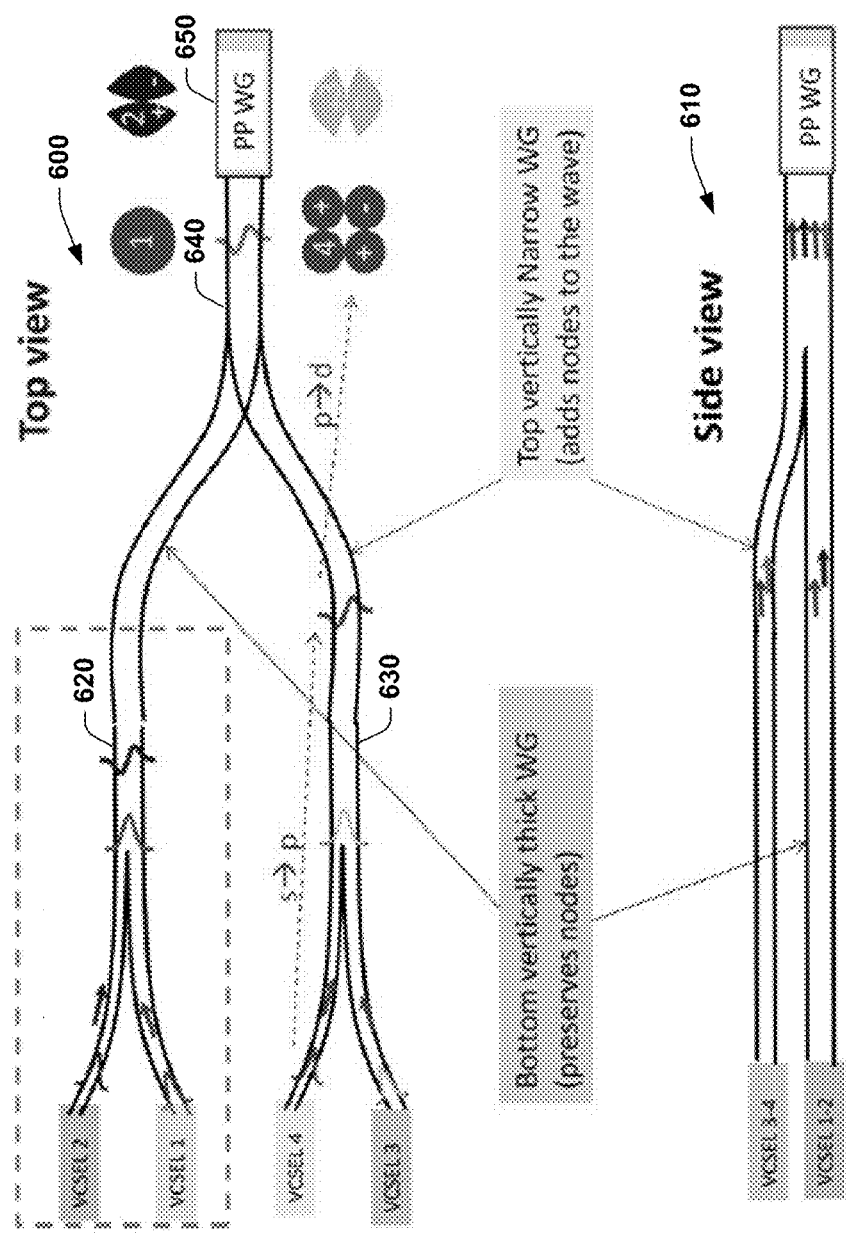
FIG. 6 illustrates a top view and a side view of a cascaded set of Y-junction couplers for generating spatially multiplexed optical signals.

FIG. 6 illustrates a top view 600 and a side view 610 of a cascaded set of Y-junction couplers for generating spatially multiplexed optical signals. As shown, Y-junction couplers 620 and 630 launch and mix optical signals from wide and narrow waveguide inputs into a subsequent Y-junction coupler 640 to produce four orthogonal modes that are directed to a multimode waveguide 650. Such system can support substantially any modulation format (e.g., it can be on-off keying at 20-40 GHz or it can be FSK format using VCSELs). In this example, VCSELs 1 and 2 are below VCSELs 3 and 4 in vertical alignment (e.g., 2×2 VCSEL array), wherein coupling can occur in two steps and four propagating modes can be generated in the waveguide 650. However, some of the propagating modes may be degenerate and a diversity system can be employed such as depicted in FIG. 7 and described below.

With respect to waveguide dimensions, the following provides some example configurations that can be employed. In one example, a material with refraction index n1=1.52, and the cladding with the index n=1.51 (e.g., Dow Corning polymer type 1) can be employed. A wavelength of interest, λ=1.3 um for example can be considered, with a Dow Corning polymer with the above indices for the core and the cladding. All upper waveguides can be 2.8 microns thick, for example (all waveguides supporting Y-junction 620). The width of first waveguide (narrow arm 620) can be 4 microns and the second width (wide arm 620) can be 8 microns and they merge into 12×2.8 micron guide of the Y-junction 620, which supports two modes. Lower waveguides can be 3.6 microns thick (all waveguides supporting Y-junction 630). The width of first waveguide can be 4 microns (narrow arm 630) and the second width can be 8 microns (wide arm 630) and they can merge into 12×3.6 micron waveguide of the Y-junction 630, which support two modes. Then, two waveguides, the upper 12×2.8 of 620 and the lower 12×3.6 of 630 merge into one 12×8 micron waveguide at 640 supporting four modes, which then narrows into 8×8 micron multimode waveguide 650 and couples into waveguide (e.g., for less than 1 km links can be directed into multimode fiber, since mixing there is small).

In an alternative example, n1=1.51 index core with n2=1.50 index cladding (e.g., Dow Corning type). The top waveguides can be 6 microns thick. The width of the first waveguide can be 6 microns (narrow arm 620) and the second width can be 10 microns (wide arm 620) and they merge into 16×6 micron guide of Y-junction 620 which supports two modes. Lower waveguides can be 8 microns thick. The width of first waveguide can be 6 microns (narrow arm 630) and the second width can be 10 microns (wide arm 630) and they merge into 16×8 micron guide of coupler 630 which supports two modes. Then, the two waveguides, the upper one 16×6 and the lower 16×8 merge into one 16×14 micron guide at 640 supporting four modes which then narrows into 14×14 micron guide 650 and couples into the waveguide (or fiber for links <1 km). The angles between the waveguides are about 1 degree. Thus, one should separate them by about 10 microns, so the length should be 10 um/1 degree in radians=10*50=500 um.

FIG. 7 illustrates an alternative configuration for a cascaded set of Y-junction couplers for generating and receiving spatially multiplexed optical signals. A transmitter portion 710 and receiver portion 720 can be configured with a diversity configuration which accounts for potential degenerate launched modes in the transmitter 710 which can launch two pairs of even-odd modes into top and bottom waveguides from three VCSELs, which are then aligned vertically. However, two of the four modes may be degenerate, e.g., they have identical propagation constants in the waveguide. Therefore, unless a polarization preserving rectangular guide or a special fiber with some type of an elliptical cross-section were applied, these two modes can mix and de-multiplexing would then require some form of coherent detection which can increase cost. To mitigate the mixing issue (in order not to use coherent detection), 25% of the transmission capacity can be reduced wherein three channels instead of four are employed for detection. Thus, launch substantially identical signals into these two modes and then combine two signals from detectors into one signal.

As shown, VCSEL 2 in the transmitter 710 can send signal into the wider upper waveguide (6×10 micron) and also into narrower lower 8×6 micron waveguides. Also, VSEL 1 can send signal into the upper 6×6 microns waveguide and VCSEL 3 into lower 8×10 micron waveguide. Now, in the diversity configuration, the VCSEL2 sends its signal in a superposition of two 01 modes, then in the waveguide (or fiber) these two modes mix wherein exact orientation of the mode at the receiver is not known. Therefore, detect two modes with the same signal independently on Detectors 2A and 2B in the receiver 720, and then add the signals which provide the diversity detection.

Figure 8:
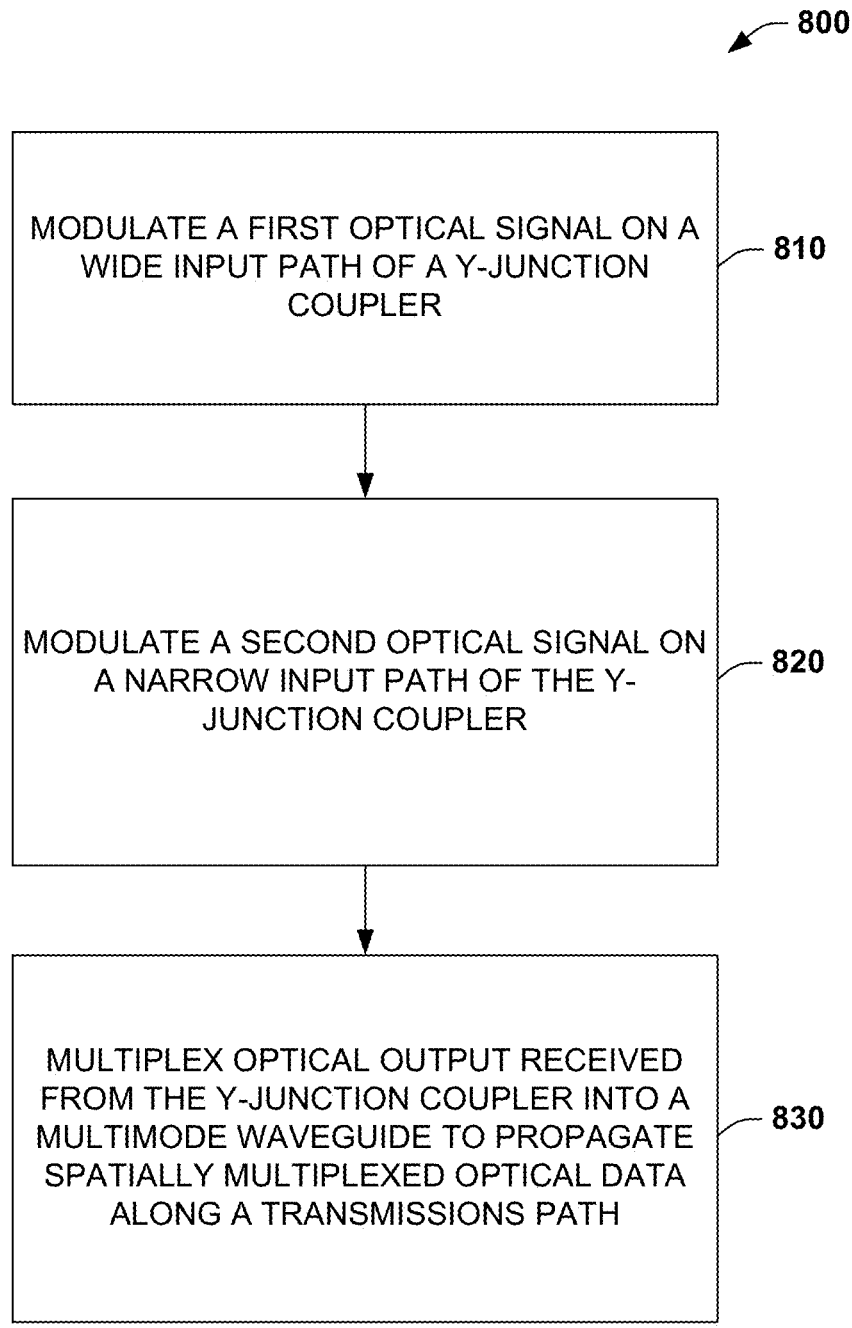
FIG. 8 illustrates a flowchart of an example method for generating and receiving spatially multiplexed optical signals.

In view of the foregoing structural and functional features described above, an example method will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 8 illustrates a flowchart of an example method 800 for generating and receiving spatially multiplexed optical signals. At 810, the method 800 includes modulating a first optical signal on a wide input path of a Y-junction coupler. At 820, the method 800 includes modulating a second optical signal on a narrow input path of the Y-junction coupler. At 830, the method 800 includes multiplexing optical output received from the Y-junction coupler into a multimode waveguide to propagate spatially multiplexed optical data along a transmissions path. The method 800 can also include cascading a second Y-junction coupler with the Y-junction coupler to increase a number of propagation modes in the spatially multiplexed optical data. This can also include configuring a receiver having a multimode waveguide, Y-junction coupler (or couplers) and a detector to de-multiplex the spatially multiplexed optical signal received from the transmissions path.

The method 800 can also be utilized with a system. The system can include a first Y-junction coupler having a wide input path and narrow input path to receive a first subset of modulated optical input signals. The system includes a second Y-junction coupler having a wide input path and narrow input path to receive a second subset of modulated optical input signals. This can include a third Y-junction coupler to combine output from the first and second Y-junction couplers and generate a combined optical output signal. The system can also include a multimode waveguide that receives the combined optical output signal from the third Y-junction coupler and generates a spatially multiplexed optical output signal along a transmissions path. This can include modulating one input from the first Y-junction coupler and one input from the second Y-junction coupler with a single modulation source in order to mitigate effects of degeneration as noted previously. In another example, diversity detection can be provided in a receiver such as shown in the example 720 of FIG. 7. The method 800 can include detecting two signal modes from a common signal on two detectors in the receiver and combining the signal modes with the proper weightings to provide diversity detection in the receiver and mitigate issues of degenerate modes being launched in the transmitter.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
    first and second optical Y-junction couplers to each receive a first modulated optical signal on a wide input path of the first and second optical Y-junction couplers and to each receive a second modulated optical signal on a narrow input path of the first and second optical Y-junction couplers, wherein the first and second optical Y-junction couplers each generate a combined optical signal from signals received on the wide input path and the narrow input path, respectively;
    a third Y-junction coupler, coupled to an output of each of the first and second optical Y-junction couplers, to receive the combined optical signals including two orthogonal propagation modes from each of the first and second optical Y-junction couplers and combine the two orthogonal propagation modes from each of the first and second optical Y-junction couplers into four orthogonal propagation modes;
    a multimode waveguide to receive the combined optical signal from the third optical Y-junction coupler and to propagate the four orthogonal propagation modes along a transmission path; and
    a receiver comprising four detectors to detect the four orthogonal propagation modes, respectively, from a common signal and to de-multiplex the four orthogonal propagation modes to provide diversity detection in the receiver.

2. The system of claim 1, wherein the transmission path is an optical communications bus, an optical backplane, or a signal path within a light processor that employs optical signals for data processing, communications, or instruction execution.

3. The system of claim 1, further comprising a vertical cavity surface emitting laser (VCSEL), a Fabry-Perot laser, or a distributed feedback laser coupled to the optical Y-junction coupler.

4. The system of claim 3, wherein the VCSEL is modulated via on-off keying (OOK) method, a frequency-keyed shifting (FSK) method, pulse amplitude modulation (PAM) method or a quadrature phase shift keying (QPSK) method.

5. The system of claim 1, further comprising a Mach-Zehnder interferometer (MZI) modulator coupled to the optical Y-junction coupler.

6. The system of claim 1, wherein the multimode waveguide is a polarization preserving and a mode preserving waveguide.

7. The system of claim 1, wherein the multimode waveguide is a first multimode waveguide, the receiver receives the spatially multiplexed output signal from the transmissions path, the receiver further comprising:
    a second multimode waveguide to receive the four orthogonal propagation modes and output another combined optical signal;
    a fourth Y-junction coupler to receive the four orthogonal propagation modes and output first and second modulated optical signals on a first output path and third and fourth modulated optical signals on a second output path;
    fifth and sixth Y-junction couplers each to receive two of the four modulated optical signals, and to each:
        output a given modulated output signal on a wide output path of the other Y-junction coupler; and
        output another modulated output signal on a narrow output path of the other Y-junction coupler;
    wherein a given two detectors of the four detectors is coupled to the wide output path of the other first and second Y-junction couplers, respectively, the given two detectors to detect modulated data encoded in the given modulated output signal; and
    wherein another two detectors of the four detectors is coupled to the narrow output path of the other first and second Y-junction couplers, respectively, the other two detectors to detect modulated data encoded in the other modulated output signal.

8. A method comprising:
    modulating a first optical signal on a wide input path of a first Y-junction coupler;
    modulating a second optical signal on a narrow input path of the first Y-junction coupler;
    modulating a third optical signal on a wide input path of a second Y-junction coupler;
    modulating a fourth optical signal on a narrow input path of the second Y-junction coupler;
    multiplexing two orthogonal propagation modes received from each of the first and second Y-junction couplers into four orthogonal propagation modes to propagate the four orthogonal propagation modes along a transmissions path;
    detecting, in four detectors of a receiver, the four orthogonal propagation modes from a common signal; and de-multiplexing the four orthogonal propagation modes to provide diversity detecting in the receiver.

9. A system, comprising:
a first Y-junction coupler having a wide input path and narrow input path to receive a first subset of modulated optical input signals;
a second Y-junction coupler having a wide input path and narrow input path to receive a second subset of modulated optical input signals;
a third Y-junction coupler, coupled to an output of each of the first and second optical Y-junction couplers, to receive combined optical signals including two orthogonal propagation modes from each of the first and second optical Y-junction couplers and combine the two orthogonal propagation modes from each of the first and second Y-junction couplers into four orthogonal propagation modes;
a multimode waveguide that receives the four orthogonal propagation modes from the third Y-junction coupler and generates a spatially multiplexed optical output signal along a transmissions path; and
a receiver comprising four detectors that detects the four orthogonal propagation modes from a common signal on the four detectors and de-multiplexes the four orthogonal propagation modes to provide diversity detection in the receiver.

10. The system of claim 1, wherein the first optical signal has a given wavelength and the second optical signal has another wavelength, wherein the given and the other wavelengths are separated by at least 50 nanometers.

11. The system of claim 1, wherein the third Y-junction coupler receives the combined optical signals including two orthogonal propagation modes from the first optical Y-junction coupler on a narrow input path of the third Y-junction coupler and receives the combined optical signals including two orthogonal propagation modes from the second optical Y-junction coupler on a wide input path of the third Y-junction coupler.

12. The method of claim 8, wherein the multiplexing comprises:
receiving the combined optical signals including two orthogonal propagation modes on a narrow input path of a third Y-junction coupler; and
receiving the combined optical signals including two orthogonal propagation modes from the second optical Y-junction coupler on a wide input path of the third Y-junction coupler.

13. The system of claim 9, wherein the third Y-junction coupler receives the combined optical signals including two orthogonal propagation modes from the first optical Y-junction coupler on a narrow input path of the third Y-junction coupler and receives the combined optical signals including two orthogonal propagation modes from the second optical Y-junction coupler on a wide input path of the third Y-junction coupler.

* * * * *